2,791,604
Patented May 7, 1957

2,791,604
PRODUCTION OF α-NITROESTERS

Robert K. Blackwood, Uncasville, Conn., and Nathan Kornblum, West Lafayette, Ind., assignors to Purdue Research Foundation, Lafayette, Ind., a corporation of Indiana Application February 28, 1956, Serial No. 568,183

3 Claims. (Cl. 260—471)

The present invention relates to the preparation of nitroesters wherein the nitro group, —$NO_2$ is positioned alpha to the carbalkoxyl radical. More particularly, the present invention pertains to the preparation of such nitro compounds, commonly called alpha-nitroesters, from the corresponding alpha-haloesters.

In U. S. patent application 505,560, filed May 2, 1955 in the name of Nathan Kornblum, there is disclosed a method for the preparation of nitroalkanes which comprises reacting an alkali metal nitrite in dimethylformamide with an ester of a cycloalkanol or a primary or secondary alkanol and an acid selected from the group consisting of hydrobromic, hydroiodic, and sulfonic acids. While this process is quite satisfactory for the preparation of nitroalkanes and nitrocycloalkanes, it is unsuitable for the synthesis of alpha-nitroesters. When the technique of this process is applied to alpha-haloesters for the production of alpha-nitroesters, both the isomeric nitro and nitrite esters are formed and the joint action of the alkali metal nitrite and the nitrite ester destroys the alpha-nitroester as it is formed. The products obtained from such a reaction mixture are primarily the alpha-hydroxy and alpha-oximino esters.

We have found that pure alpha-nitroesters in relatively high yields may be obtained by carrying out the reaction of the alkali metal nitrite and alpha-haloesters in dimethylformamide in the presence of a compound selected from the class consisting of phloroglucinol, resorcinol, and catechol. The latter compounds act as a scavenger for the nitrite esters and by reacting with any nitrite ester immediately upon its formation, they prevent nitrosation of the alpha-nitroester. Of the three scavengers, phloroglucinol is by far the most efficient and is distinctly superior.

A more complete understanding of the invention will be gained from a consideration of the following examples:

*Example 1.—Preparation of ethyl alpha-nitrobutyrate*

Ethyl alpha-bromobutyrate (58.5 g., 0.30 mole) is poured into a stirred mixture of 600 ml. N,N-dimethylformamide (DMF), 36 g. of sodium nitrite (0.52 mole) and 40 g. of anhydrous phloroglucinol (0.32 mole) in a 1 liter three necked flask equipped with a sealed stirrer. The flask is stoppered, immersed in a water bath maintained at room temperature, and stirring is continued for 2.5 hours. The reaction mixture is then poured into 1.2 liter of ice-water layer over with 300 ml. of diethyl ether. After separation of the upper layer, the aqueous phase is extracted four more times with 100 ml. portions of ether. The combined extracts are washed with four 100 ml. portions of water and then dried over anhydrous magnesium sulfate. The mixture is filtered with suction, the magnesium sulfate is washed with four 25 ml. portions of ether and these are combined with the filtrate.

Using a small column, the ether is removed under reduced pressure, heat being supplied by a bath whose temperature is gradually raised to ca. 60°. The residual yellow liquid is transferred, with the aid of a little anhydrous ether, to a 100 ml. flask, the column is attached and the remaining solvent is removed under reduced pressure. Rectification of the residue yields 2–3 g. of forerun which comes over in the range 33–71°/1 mm. which is followed by 34–36 g. (70–75%) of colorless ethyl alpha-nitrobutyrate (B. P. 71°/1 mm.; $n_D^{20}$ 1.4233).

*Example 2.—Preparation of ethyl alpha-nitro-alpha-phenylacetate*

The equipment and conditions were similar to those used in Example 1. The reagents were 300 ml. DMF, 18 g. $NaNO_2$, 20 g. anhydrous phloroglucinol and 36.5 g. (0.15 mole) ethyl alpha-bromo-alpha-phenlyacetate. The reaction time was 2.5 hr. After stripping off the ether, the residue was shaken for 10 min. with a solution of 40 g. $Na_2CO_3$ in 200 ml. of water. The two phase system was extracted with ether and the ether layer discarded. The aqueous layer was then acidified with 20% acetic acid. The organic layer which formed was separated and combined with ether extracts of the aqueous layer. The ether solution was washed with water, the ether was stripped off and the product was distilled to give a 70% yield of material of constant boiling point (92°/0.15 mm.) and refractive index ($n_D^{20}$ 1.5098).

*Example 3.—Preparation of ethyl alpha-nitropropionate*

The equipment and conditions were similar to those used in Example 1. The reagents used were 600 ml. DMF, 36 g. (0.52 mole) sodium nitrite, 54.3 g. (0.30 mole) ethyl alpha-bromopropionate and 25 g. (0.15 mole) phloroglucinol dihydrate. The reaction time was 5 hr. The deeply brown reaction mixture was worked up as in Example 1. A 64% yield of ethyl alpha-nitropropionate, B. P. 54°/2 mm.; $n_D^{20}$ 1.4210 was obtained.

*Example 4.—Preparation of ethyl alpha-nitropropionate*

The equipment and conditions were similar to those used in Example 1. The reagents were 600 ml. DMF, 25 g. phloroglucinol dihydrate, 36 g. sodium nitrite and 68.4 g. ethyl alpha-iodopropionate. Reaction time was 2 hr. at room temperature. Rectification gave a 62% yield of the alpha-nitroester; B. P. 50°/0.8 mm.; $n_D^{20}$ 1.4210.

*Example 5.—Preparation of ethyl alpha-nitroisobutyrate*

The equipment and conditions were similar to those used in Example 1. The reagents were 600 ml. DMF, 36 g. $NaNO_2$ and 58.5 g. of ethyl alpha-bromoisobutyrate. Reaction time was 44 hr. Rectification gave a 77% yield of ethyl alpha-nitroisobutyrate; B. P. 48°/1 mm.; $n_D^{20}$ 1.4199.

*Example 6.—Attempted preparation of ethyl alpha-nitropropionate from ethyl alpha-iodopropionate*

The equipment and conditions were similar to those used in Example 4. The reagents were 600 ml. DMF, 36 g. sodium nitrite, 68.4 g. ethyl alpha-iodopropionate and 40 g. urea. Reaction time was 6 hr. at −20° to −15°. The reaction mixture was worked up as in Example 4. Rectification gave 3.48 g. (8% yield) of ethyl alpha-nitropropionate, $n_D^{20}$ 1.4208–1.4214; B. P. 50–52° at 2 mm. In addition 7.2 g. of ethyl alpha-oximinopropionate, M. P. and mixed M. P. 94–94.5°, was isolated.

*Example 7.—Attempted preparation of ethyl alpha-nitropropionate from ethyl alpha-bromopropionate*

The equipment and conditions were similar to those used in Example 3. The reagents employed were 600 ml. DMF, 36 g. sodium nitrite, 40 g. urea and 54.3 g. (0.3 mole) of ethyl alpha-bromopropionate. Reaction time was 3 hr. at room temperature. On working up the reaction mixture as in Example 3 pure ethyl alpha-oximinoproportionate (M. P. 94–95.5°, mixed M. P. with an authentic sample 94–94.5°) was isolated but none of the desired ethyl alpha-nitropropionate was obtained.

An identical experiment, except that a reaction time of 5.5 hours was used, again gave no ethyl alpha-nitropropionate. Instead a 24% yield of pure ethyl alpha-oximinopropionate was obtained.

*Example 8.—Preparation of ethyl alpha-nitropropionate*

The equipment and conditions were similar to those used in Example 7. The reagents were 600 ml. DMF, 36 g. sodium nitrite, 54.3 g. ethyl alpha-bromopropionate, 40 g. urea and 16.5 g. of resorcinol. Reaction time 3 hr. The reaction mixture was worked up as in Example 3. A 26% yield of ethyl alpha-nitropropionate, B. P. 44° at 0.5 mm.; $n_D^{20}$ 1.4210 was obtained.

In the present process, any alkali metal nitrite is suitable. Sodium nitrite has been used most extensively because of its ready availability.

When the alpha-nitroester sought has no alpha-hydrogen atom, then it is stable to the joint action of the sodium nitrite and the nitrite ester. In such a case the scavenger is not needed, since the alpha-nitroester can be obtained in good yields without the scavenger, as is illustrated in Example 5. However, if the scavenger is added it will not affect or interfere with the reaction. If there is an alpha-hydrogen on the alpha-nitroester which is sought, even small amounts of the nitrite ester will promote the destruction of large amounts of the alpha-nitroester. In the absence of the scavenger, no alpha-nitroester can be obtained from bromides and very little from iodides.

Though resorcinol and catechol are operative, they are distinctly less efficient then phloroglucinol, and the latter represents by far the most preferred embodiment of the invention.

Temperature does not appear to greatly affect the present process. In the preparation of ethyl alpha-nitropropionate equivalent yields were obtained at 0° and 25° C. At the latter temperature, extension of the reaction time for a considerable period did not result in a lowering of the yield. Temperatures as high as 60°–70° C., and in some cases even 100° C., are operable, though temperatures below about 40° C. are preferable since the scavenger functions most efficiently at the lower temperatures.

The reaction of the present invention may be represented as follows:

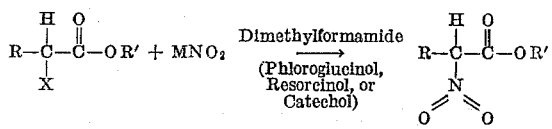

where X is a bromine, iodine, or chlorine atom, R and R' are the same or different alkyl, cycloalkyl, aryl, or alkaryl radicals, and M is an alkali metal, such as sodium, potassium, or lithium. As can be seen from the examples, the alpha-nitroester product in yields of 60–80% may be obtained.

Alpha-nitroesters prepared by the present invention are useful in a wide variety of organic syntheses, especially in the pharmaceutical field. The nitroesters may be reduced to the aminoesters from which the amino acids may easily be obtained. Ethyl nitromalonate, which may be prepared from ethyl bromomalonate by the process of the present invention, can be used in the preparation of tryptophane, an important alpha-amino acid, according to the method of Lyttle and Weisblett set forth in the American Chemical Society Journal, vol. 69 (Aug.–Dec. 1947), pages 2118–9.

Having thus described our invention, we intend to be limited only by the following claims.

We claim:
1. A process for preparing an alpha-nitroester having an alpha-hydrogen from the corresponding alpha-haloester which comprises mixing the alpha-haloester in dimethylformamide with an alkali metal nitrite and a compound selected from the class consisting of phloroglucinol, resorcinol, and catechol.
2. A process as in claim 1, wherein the last-named compound is phloroglucinol.
3. A process as in claim 1, wherein the alkali metal nitrite is sodium nitrite.

References Cited in the file of this patent

Hickinbottom: "Reactions of Organic Compounds," pgs. 236 and 237 (1948).